United States Patent [19]
Bodo

[11] Patent Number: 5,426,993
[45] Date of Patent: Jun. 27, 1995

[54] COVER UNIT FOR THE PASSAGE OF A STEERING WHEEL COLUMN THROUGH THE PARTITION WALL OF AN AUTOMOBILE

[75] Inventor: Giuseppe Bodo, I-Vercelli, Italy

[73] Assignee: A. Raymond & CIE, Grenoble, France

[21] Appl. No.: 87,107

[22] Filed: Jul. 1, 1993

[30] Foreign Application Priority Data
Jul. 2, 1992 [DE] Germany ............ 42 21 669.9

[51] Int. Cl.⁶ .................................. G05G 11/00
[52] U.S. Cl. .................... 74/484 R; 74/485
[58] Field of Search ........ 74/484 R, 485, 558.5, 74/563, 608

[56] References Cited
U.S. PATENT DOCUMENTS

| | | | |
|---|---|---|---|
| 2,876,654 | 3/1959 | Sweitzer | 74/484 R |
| 3,442,149 | 5/1969 | Schwendenmann | 74/484 R |
| 3,550,551 | 12/1970 | Miller | 74/484 R |
| 3,768,330 | 10/1973 | Gejoff | 74/484 R |
| 4,091,898 | 5/1978 | Diaz | 74/484 R X |
| 4,627,522 | 12/1986 | Ulrich et al. | 74/484 R |

FOREIGN PATENT DOCUMENTS

| | | | |
|---|---|---|---|
| 1029637 | 6/1953 | France | 74/484 R |
| 2548020 | 4/1976 | Germany | 74/484 R |
| 2457498 | 6/1976 | Germany | 74/484 R |
| 2530189 | 1/1977 | Germany | 74/484 R |
| 3701597 | 6/1990 | Germany | 74/502.4 |
| 259013 | 12/1948 | Switzerland | 74/484 R |

Primary Examiner—Vinh T. Luong
Attorney, Agent, or Firm—Finnegan, Henderson, Farabow, Garrett & Dunner

[57] ABSTRACT

A cover unit for sealing the passage of a steering wheel column through an opening in the partition wall of a motor vehicle having a front wheel steering assembly including a steering wheel column. The unit includes a coverplate to be positioned against the engine side of the partition wall, the coverplate having an annular sealing sleeve extending outwardly from one side of said coverplate for insertion through the opening in the partition wall. The steering wheel column is axially insertable through the annular sleeve of the coverplate and shoulder in the sleeve serving as a stop for a collar on the steering wheel column is provided to limit the travel of the column through the plate. The unit also includes a counterplate to be positioned against the driver's side of the partition wall, the counterplate having a cylindrical opening therein and a locking ring extending outwardly from one side of the counterplate coaxial with the opening. The opening in the counterplate slides down over the steering wheel column and the locking ring engages and locks with rings on the outer surface of the sealing sleeve of the coverplate when the counterplate is pressed against the driver's side of the partition wall to lock the plates together.

4 Claims, 2 Drawing Sheets

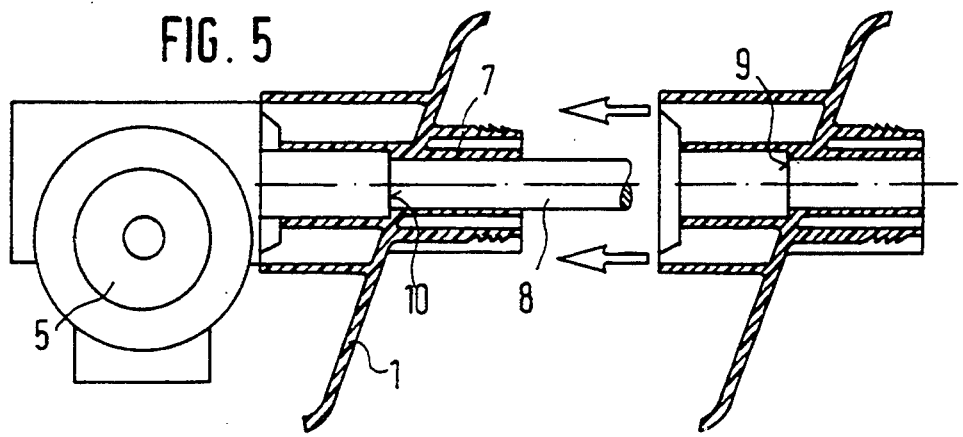
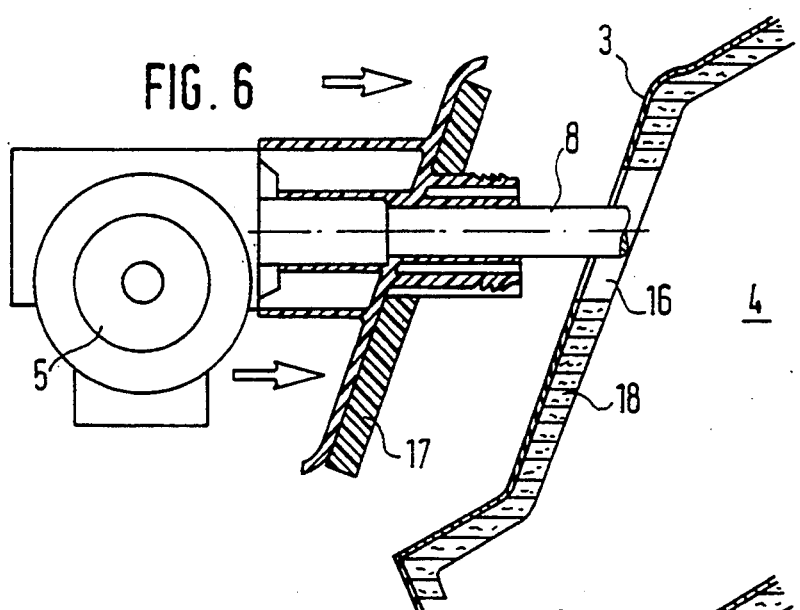
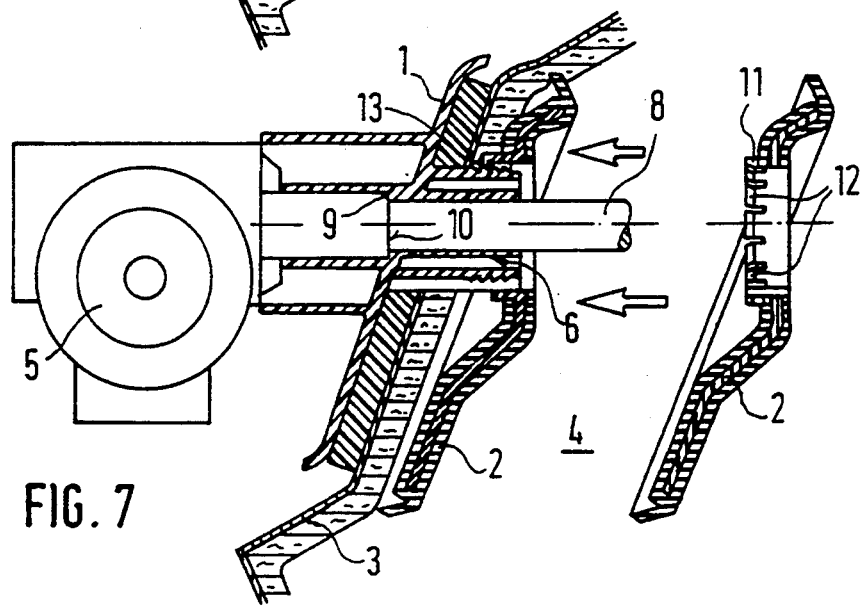

COVER UNIT FOR THE PASSAGE OF A STEERING WHEEL COLUMN THROUGH THE PARTITION WALL OF AN AUTOMOBILE

BACKGROUND OF THE INVENTION

This invention relates to a cover unit for sealing the passage of a steering wheel column through the partition or fire wall located between the driver's compartment and the engine compartment of a motor vehicle.

To seal the steering column opening against engine noise and/or road noise and against gases and vapors which form in the engine compartment, steering columns are usually surrounded at the partition wall adjoining the driver's compartment by a rubber collar that rests against an edge of the opening on both sides of the partition wall in a sealed manner. See German Patent No. DE 37 01 597. It is to be noted in this connection, that the installation of the rubber collar is very laborious and usually requires two people, one to press on the collar from the engine side and one to pull the collar in from the driver's side and press it in a sealed manner against the edges of the opening.

An object of the present invention therefore is to provide a cover unit for sealing a steering wheel column that can be installed in a rapid and problem-free manner from only one side.

SUMMARY OF THE INVENTION

In accordance with the object, this invention provides a cover unit for sealing the passage of a steering wheel column through an opening in the partition wall between the engine compartment and the driver's compartment of a motor vehicle having a front wheel steering assembly including a steering wheel column, said unit comprising a coverplate to be positioned against the engine compartment side of the partition wall, said coverplate having an annular sealing sleeve open at both ends and extending outwardly from at least one side of said coverplate for insertion through the opening in the partition wall from said engine compartment side of the wall, said steering wheel column being axially insertable through said annular sleeve from the side of the coverplate opposite from that from which said sleeve extends and an annular shoulder in said sleeve serving as a stop for a collar on the steering wheel column to limit the distance said column can be inserted through said sleeve and a counterplate to be positioned against the driver's compartment side of said partition wall, said counterplate having a cylindrical opening therein and a locking ring extending outwardly from one side of the counterplate coaxial with said opening in the counterplate, said opening in the counterplate being slidable over said steering wheel column and said locking ring engaging with said sealing sleeve of the coverplate when the counterplate is pressed towards the driver's compartment side of the partition wall and cooperating locking means on said locking ring and sleeve for locking said plates together.

As a result, the possibility is provided of initially prefitting the coverplate of the cover unit on the steering column, the sealing sleeve with the annular shoulder face being supported on the face of the collar of the steering column. The sealing sleeve and steering column are then inserted through the opening in the partition wall until the coverplate of the unit comes to rest against the engine side of the partition wall. After the steering gear has been attached to the vehicle frame or body of the vehicle in the customary manner, thus anchoring the coverplate against further movement, the counterplate can easily be fitted on over the steering column from the driver's side and readily locked to the sealing sleeve of the coverplate.

BRIEF DESCRIPTION OF THE DRAWINGS

The features of the invention are explained in greater detail below in conjunction with an exemplary embodiment of the invention as shown in the drawings, in which:

FIG. 5 shows the coverplate being fitted onto the steering column of a front-wheel steering assembly;

FIG. 6 shows the coverplate and the steering column being inserted through an opening in the partition wall; and FIG. 7 shows the counterplate being pressed against the partition wall from the opposite side and secured to the sealing sleeve of the coverplate.

DETAILED DESCRIPTION OF THE INVENTION

Figure 1:
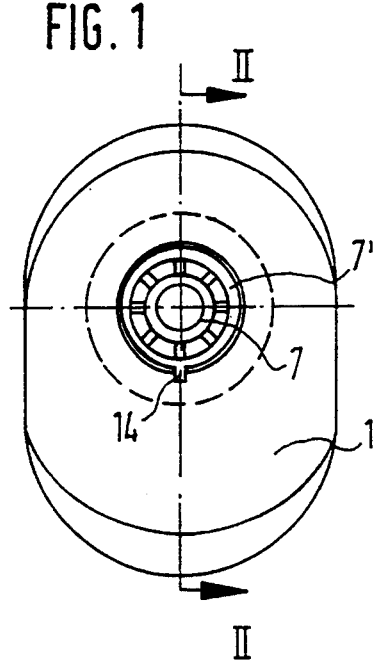
FIG. 1 is a plan view of the coverplate of the cover unit of the invention showing the sealing sleeve.
Figure 2:
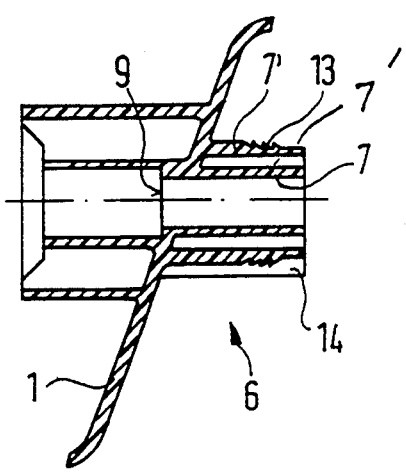
FIG. 2 is a sectional view taken through the coverplate along the line II—II in FIG. 1.
Figure 4:
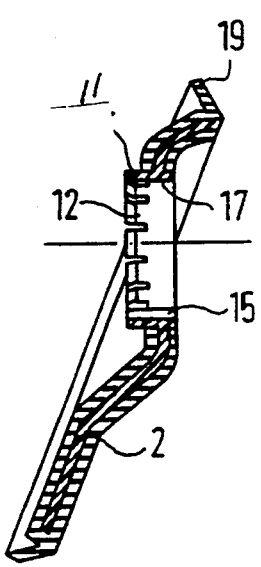
FIG. 4 is a sectional view taken through the counterplate along the line IV—IV in FIG. 3.
Figure 3:
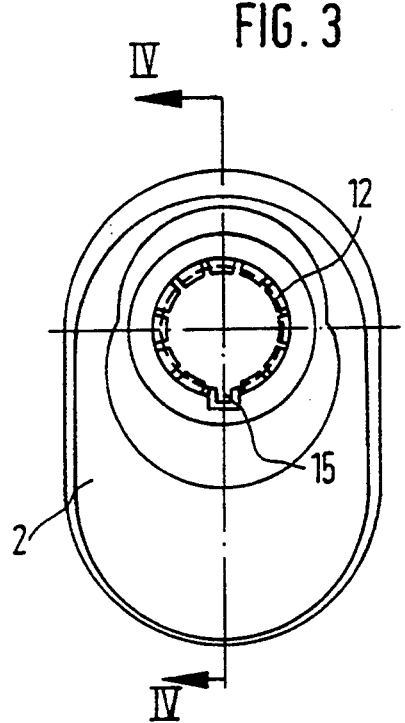
FIG. 3 is a plan view of the counterplate.

The cover unit shown in FIGS. 1-4 consists of a coverplate 1, which can be pressed in a sealed manner onto the engine compartment side of a partition wall 3 between the driver's side 4 and the space for a front-wheel steering assembly 5 in the engine compartment of a motor vehicle, and of a counterplate 2 that is pressed onto the coverplate 1 from the driver's side.

Coverplate 1 has a shape matched to the surface of the engine compartment side of partition wall 3 and a double-walled, annular sealing sleeve 6 that extends outwardly therefrom towards the driver's side 4. The inner cylindrical surface 7 of sleeve 6 receives, with a small degree of play, the steering column 8 of front-wheel steering assembly 5. Inner surface 7 also has an annular shoulder or face 9 offset outwardly in the fitting-on direction serving as a stop for a collar 10, which is also offset outwardly on steering column 8 to limit the distance the column can be inserted through the sleeve. This provides the advantage during installation of the coverplate 1 being supported by the steering column 8.

Counterplate 2 has a shape that is matched to the inside or driver's side surface of partition wall 3. It includes a cylindrical opening 17 and an annular locking ring 11 that extends outwardly from one side of the plate and is shaped to slide over sealing sleeve 6. Locking means comprising a plurality of annularly spaced and inwardly protruding resilient locking teeth 12 on locking ring 11, which can spring back and are bevelled counter to the fitting-on direction, and a plurality of cooperating rings 13 on the outer surface 7' of sleeve 6 that are bevelled in the fitting-on direction so as to engage with locking teeth 12 are provided for locking the two plates together.

Sealing sleeve 6 also has on its outer surface 7' a key 14 that extends parallel to the axis of the sleeve for registry with a corresponding groove 15 in the inside of locking ring 11 of counterplate 2 when the two parts are engaged with each other. This keeps the two plates properly aligned with respect to partition wall 3.

The installation sequences for the cover unit for sealing the passage of steering wheel column 8 are illustrated in FIGS. 5–7.

Initially, and as shown in FIG. 5, coverplate 1 is fitted over steering column 8 of a front-wheel steering assembly 5 in the direction of the arrows until annular shoulder 9 of sleeve 6 rests on the collar face 10 of steering column 8.

Then, as shown in FIG. 6, steering column 8 and sealing sleeve 6 of coverplate 1 are inserted through opening 16 in partition wall 3 from the engine compartment side and front-wheel steering assembly 5 is secured to the frame or body of the motor vehicle in the customary manner (not shown). This then holds coverplate 1 in place against partition wall 3. Preferably a noise-damping sealing sheet 17 is inserted between coverplate 1 and partition wall 3 and the partition wall itself is provided on driver's side 4 with a noise-damping layer 18.

Finally, as shown in FIG. 7, counterplate 2 is then pressed onto sleeve 6 of coverplate 1 from the driver's compartment side, locking ring 11 passing down steering column 8 and onto sealing sleeve 6 until an obliquely outwardly protruding edge 19 on counterplate 2, which points towards partition wall 3, digs into damping layer 18. At this point, teeth 12 on ring 11 have engaged with rings 13 on sleeve 6, thus locking the two plates together and providing a sealed connection around the steering column with respect to the engine compartment.

What is claimed is:

1. A cover unit for sealing the passing of a steering wheel column through an opening in a partition wall between an engine compartment and a driver's compartment of a motor vehicle having a front wheel steering assembly including a steering wheel column having a collar, said cover unit comprising a coverplate to be positioned against the engine compartment side of a partition wall, said coverplate having an annular sealing sleeve open at both ends and extending outwardly from at least one side of said coverplate, said sleeve being adapted to be inserted through an opening in the partition wall from the engine compartment side of the wall and after being inserted in the wall to receive a steering wheel column therethrough from the side of the coverplate opposite from that from which said sleeve extends, said sleeve having an annular shoulder therein serving as a stop for the collar on the steering wheel column to limit the distance the column can pass through the sleeve and a counterplate to be positioned against the driver's compartment side of the partition wall, said counterplate having a cylindrical opening therein and a locking ring extending outwardly from one side of the counterplate coaxial with said opening in the counterplate, said opening in the counterplate being adapted to be slid over the steering wheel column from the driver's compartment side of the wall after the column has been passed through the sleeve of the coverplate and said locking ring being adapted to engage with said sealing sleeve of the coverplate when the counterplate is pressed towards the driver's compartment side of the partition wall and cooperating locking means on said locking ring and sleeve for locking said plates together.

2. The cover unit of claim 1, wherein the locking means comprises a plurality of annular spaced resilient locking teeth on a forward end of said locking ring and a plurality of cooperating annular rings on an outer surface of the annular sealing sleeve, the locking ring being adapted to be slid over the sleeve to engage the locking teeth with the rings and lock the two plates together.

3. The cover unit of claim 1, in which the sealing sleeve has an axially extending key on its outer surface that cooperates with an axially extending slot in the locking ring of said counterplate when said plates are pressed together from opposite sides of the partition wall.

4. The cover unit of claim 1, wherein said annular sealing sleeve also extends outwardly from the opposite side of the coverplate.

* * * * *